United States Patent
Linden et al.

(10) Patent No.: US 6,513,248 B2
(45) Date of Patent: Feb. 4, 2003

(54) POWER LEVER CUTTING DEVICE

(75) Inventors: Olavi Linden, Billnas (FI); Markus Paloheimo, Billnas (FI)

(73) Assignee: Fiskars Consumer Oy Ab, Billnas (FI)

( * ) Notice: Subject to any disclaimer, the term of this patent is extended or adjusted under 35 U.S.C. 154(b) by 56 days.

(21) Appl. No.: 09/742,628

(22) Filed: Dec. 20, 2000

(65) Prior Publication Data

US 2002/0073555 A1 Jun. 20, 2002

(51) Int. Cl.[7] .......................... B26B 13/00; B26B 17/00
(52) U.S. Cl. ................ 30/251; 30/190; 30/250
(58) Field of Search .................. 30/250, 190, 251; 81/367, 381, 383

(56) References Cited

U.S. PATENT DOCUMENTS

| | | | | |
|---|---|---|---|---|
| 143,454 A | * | 10/1873 | Lapham | 30/251 |
| 2,442,424 A | * | 6/1948 | McGary et al. | 30/142 |
| 3,390,455 A | * | 7/1968 | Florian | 30/190 |
| 4,094,064 A | | 6/1978 | Sakamoto | 30/92 |
| 5,159,757 A | | 11/1992 | Weid | 30/251 |
| 5,511,314 A | * | 4/1996 | Huang | 30/249 |
| 5,570,510 A | | 11/1996 | Linden | 30/250 |
| 5,697,159 A | | 12/1997 | Linden | 30/250 |
| 6,122,828 A | * | 9/2000 | Asterino, Jr. | 30/151 |
| 6,279,431 B1 | * | 8/2001 | Seber et al. | 81/355 |

* cited by examiner

*Primary Examiner*—Allan N. Shoap
*Assistant Examiner*—Isaac Hamilton
(74) *Attorney, Agent, or Firm*—Foley & Lardner

(57) ABSTRACT

A pruner has a first elongated member and a second elongated member coupled to a metal plate. The metal plate has a central aperture, a forwardly extending blade and a rearwardly extending tang having a second aperture offset from the central aperture. A jaw is mounted on the first elongated member. A power lever having a first end and a second end. A first coupler pivotably mounted in the central aperture and coupling the first member to the plate, with a second coupler pivotably mounted in the second aperture and coupling the second member to the plate. The power lever is coupled to the first and second elongated members by a third coupler pivotably coupling the first end of the power lever to the second member and a fourth coupler pivotably coupling the second end of the power lever to the first member. The power lever forces the second member to move linearly toward the first member for pivotable movement of the blade and jaw in response to linear movement of the first and second members.

20 Claims, 3 Drawing Sheets

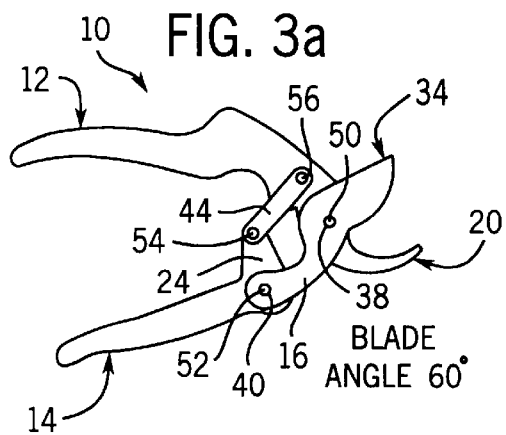
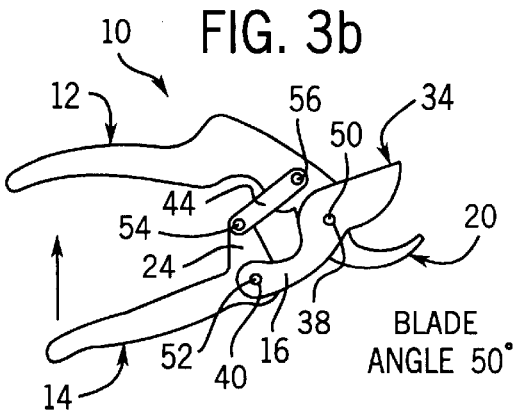
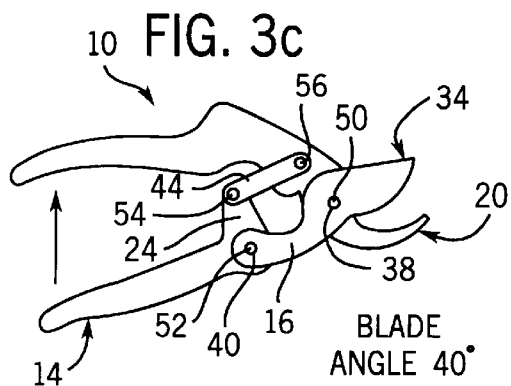
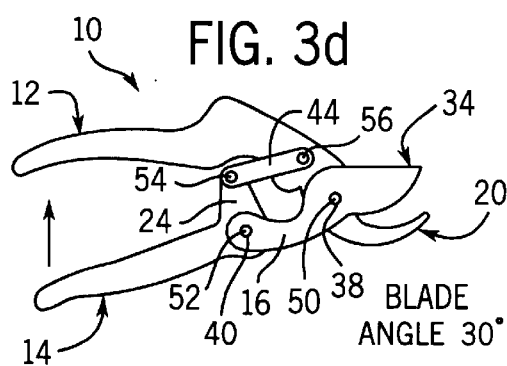
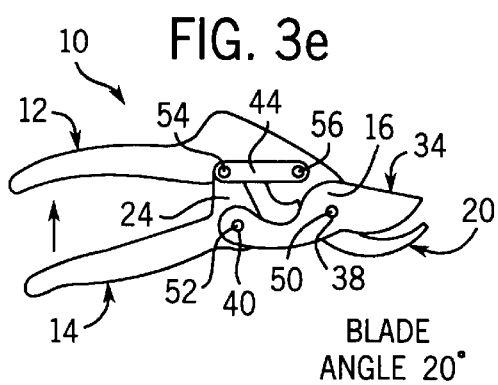
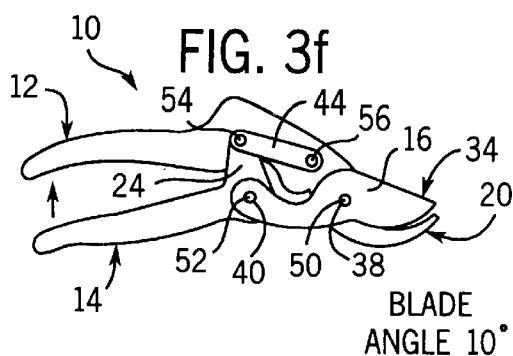
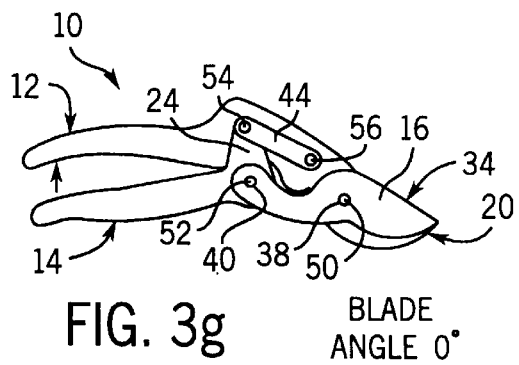

POWER LEVER CUTTING DEVICE

FIELD OF THE INVENTION

The present invention relates generally to cutting devices, and particularly to a power-lever cutting device, such as a pruner.

BACKGROUND OF THE INVENTION

Cutting devices that are used to cut or prune branches and limbs from various plant materials typically are hand held and have elongated members or handles disposed for cooperative engagement about a pivotable joint. In particular, pivoted tools, such as pruning snips or shears generally comprise two elongated members typically made of stamped or forged metal or other suitable metal disposed for cooperative engagement about the pivotable joint. Typically, each member includes a jaw in the front end portion thereof, an opposing tang, and a pair of handles connected to the jaw and tang.

In the case of conventional pivoted pruners, when cutting a branch, the cutting force applied to the branch is constant during the cutting process. Typically, the cutting force need is at its greatest is a little after the cutting blade reaches the middle of the branch or object being cut. The typical conventional pruners have a simple scissors-like mechanism with one rivet connecting the handles and the cutting jaws of the pruner. In such construction, the cutting power of the tool, at any moment of the cutting process, depends only on the force of the hand squeezing the handles at that same time. It is not unusual to have longer handles to exert a greater moment force about the pivot point in order to increase the cutting power of the cutting blades. However, such longer handles are cumbersome and difficult to use with one hand and the force is constant during the entire cutting process, regardless of the resistance being experienced by the blade.

In the known scissors-like pruner construction, typically the index and middle fingers are partly unemployed during the cutting process. Since those fingers are typically the closest fingers to the pivot point of the cutting tool jaws, their power cannot generate much torque about the pivot point. The distance moved by those two fingers is also short in comparison to the ring and little fingers of the same hand gripping the handles of the pruning tool.

In conventional pruners, as described above, the peak power of the cutting stroke is achieved as the blades pass through the middle portion of the branch or limb being cut. However, as the cutting stroke continues through the branch, not as much power is needed resulting in a relatively strong impact at the end of the cutting stroke when the resistance presented by the piece being cut is reduced. Such strong impact has been described as being a "snap-effect."

Various attempts have been made to address the problem of the snap-effect as well as maximizing the power exerted by all the fingers of the hand operating the cutting device. For example, the assignee of the present application markets a pivoted hand tool utilizing a rack and pinion mechanism between the elongated members of the tool to increase the cutting force applied by the jaws to the object being cut. Another embodiment of the present assignee's pivoted hand tool provides an elongated flexible element and groove formed in a handle of the tool at a distance from the rotation axis of the handle. However, both of these two devices are complex and difficult to assemble and manufacture. Other devices utilize longer handles to provide the necessary force or a combination of springs or rocking arms pivoted between a fixed jaw and a movable jaw with the rocking arm guided through a groove and engaging various notches to change the force applied at the jaws. Such mechanisms do not distribute the force across the fingers or hands operating such devices nor do they minimize or eliminate the snap-effect at the end of the cutting stroke.

Thus there is a need for a cutting device, such as a pruner, that provides linear movement of the handles toward each other during the cutting process. There is also a need for a cutting device that will maximize the force exerted by all of the fingers of an operator's hand during the cutting stroke. There is an additional need for a cutting device or pruner that utilizes variable cutting power during the cutting stroke of the blade and jaw of the cutting tool. There is a further need for a cutting device or pruner that will minimize or eliminate the "snap-effect" at the end of the cutting stroke.

SUMMARY OF THE INVENTION

The present invention increases the output force of a cutting device or pruner (i.e., the force applied to the piece being cut) in a variable manner as the blade and jaw travel through the piece being cut. The present invention does not rely on longer handles to increase the moment about a pivot point to increase the power during the cutting process. With the present invention, more power is used to rotate the blade instead of modifying the force about the rivets holding the blade and jaw together. A power lever coupled to the two elongated members or handles of the present cutting device cause the handles to move towards each other in a linear fashion, the effect of which is to maximize the force being exerted by all the fingers of the operator's hand.

The power-lever cutting tool in accordance with the invention comprises a metal plate having a central aperture, a forwardly extending blade and a rearwardly extending tang having a second aperture offset from the central aperture, a first elongated member comprising a first handle terminating at a distal end by a jaw, a second elongated member comprising a second handle and a power lever having a first end and a second end. The first and second elongated members are pivotally connected to the plate at the central and second apertures by couplers, respectfully. Further, the first and second elongated members are pivotally connected each to one end of the power lever so that the second elongated member moves linearly toward the first elongated member for a linear movement of the blade and jaw in response to pivotal movement of the first and second handles about couplers in the central and second apertures, respectively. The second elongated member can include a mounting finger configured to engage one end of the power lever.

According to another aspect of the present invention, a pruner comprises a first elongated member and a second elongated member coupled to a metal plate and a power lever. The metal plate has a central aperture, a forwardly extending blade and a rearwardly extending tang having a second aperture offset from the central aperture. A jaw is mounted on the first elongated member. The power lever has a first end and a second end. A first coupler pivotably mounted in the central aperture and coupling the first member to the plate, with a second coupler pivotably mounted in the second aperture and coupling the second member to the plate. The power lever is coupled to the first and second elongated members by a third coupler pivotably coupling the first end of the power lever to the second member and a fourth coupler pivotably coupling the second end of the power lever to the first member. The power lever forces the second member to move linearly toward the first member for pivotable movement of the blade and jaw in response to linear movement of the first and second members. In one embodiment the pruner includes a mounting finger formed on the second elongated member and configured to engage one end of the power lever.

Another embodiment of the present invention is a cutting device comprising a means for cutting having a central aperture, a forwardly extending blade and a rearwardly extending means for mounting having a second aperture offset from the central aperture. The first means for holding comprising a first handle terminating at a distal end by a jaw, a second means for holding comprising a second handle and a means for leveraging having a first end and a second end. The first and second means for holding are pivotally connected to the means for cutting at the central and second apertures by means for coupling, respectfully and further pivotally connected each to one end of the means for leveraging so that the second means for holding moves linearly towards the first means for holding for pivotal movement of the blade and jaw in response to the linear movement of the first and second means for holding. One aspect of the present invention provides the second means for holding includes a means for resisting configured to engage one end of the means for leveraging.

BRIEF DESCRIPTION OF THE DRAWINGS

FIG. 3a is a side plan view of an exemplary embodiment of a power lever cutting device with the blade and jaw opened by approximately 60° with respect to each other.

FIG. 3b is a side plan view of an exemplary embodiment of a power lever cutting device illustrated in FIG. 3a with the blade and jaw opened by approximately 50° with respect to each other and illustrating the linear movement of the second elongated member toward the first elongated member.

FIG. 3c is a side plan view of an exemplary embodiment of a power lever cutting device illustrated in FIG. 3a with the blade and jaw opened by approximately 40° with respect to each other and illustrating the linear movement of the second elongated member toward the first elongated member.

FIG. 3d is a side plan view of an exemplary embodiment of a power lever cutting device illustrated in FIG. 3a with the blade and jaw opened by approximately 30° with respect to each other and illustrating the linear movement of the second elongated member toward the first elongated member.

FIG. 3e is a side plan view of an exemplary embodiment of a power lever cutting device illustrated in FIG. 3a with the blade and jaw opened by approximately 20° with respect to each other and illustrating the linear movement of the second elongated member toward the first elongated member.

FIG. 3f is a side plan view of an exemplary embodiment of a power lever cutting device illustrated in FIG. 3a with the blade and jaw opened by approximately 10° with respect to each other and illustrating the linear movement of the second elongated member toward the first elongated member.

FIG. 3g is a side plan view of an exemplary embodiment of a power lever cutting device illustrated in FIG. 3a with the blade and jaw opened by approximately 0° with respect to each other and illustrating the linear movement of the second elongated member toward the first elongated member.

DETAILED DESCRIPTION OF THE PREFERRED EMBODIMENTS

Figure 1:
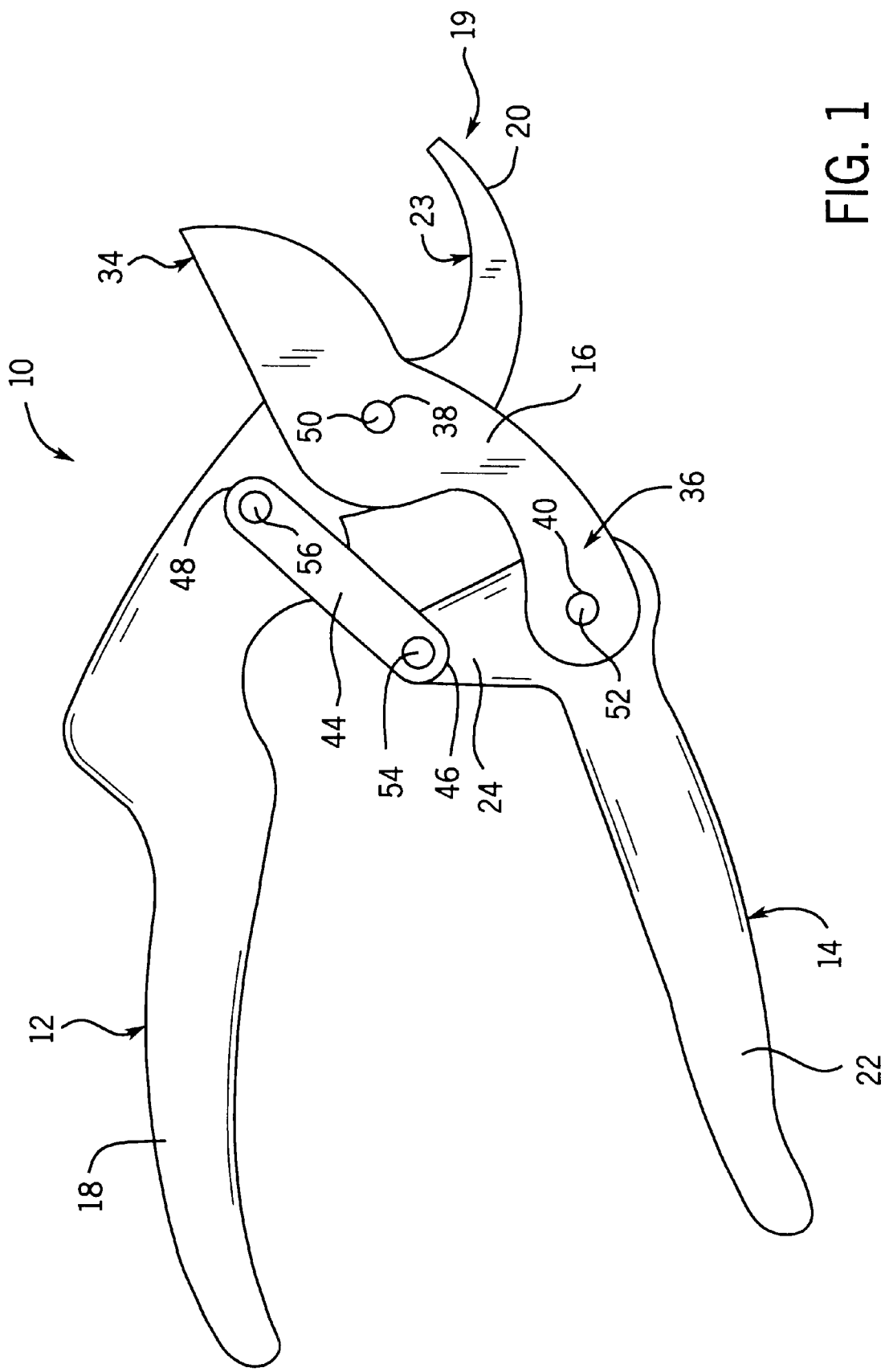
FIG. 1 is a side plan view of an exemplary embodiment of a power lever cutting device.

The invention relates to pivoted cutting tools having elongated members disposed for cooperative engagement about at least one pivotable joint wherein a force applied to the handles of the tool is transmitted to the jaws engaging a work piece to be cut. A typical application is a pruner to cut plant material such as branches, limbs and stems.

Referring to the figures, a cutting device 10 or pruner includes a metal plate 16, a first elongated member 12, a second elongated member 14 and a power lever 44. The metal plate 16 has a central aperture 38, a forwardly extending blade 34 and a rearwardly extending tang 36 with the tang 36 having a second aperture 40 offset from the central aperture 38. The first elongated member 12 comprises a first handle 18 terminating at a distal end 19 by a jaw 20. The second elongated member 14 comprises a second handle 22. The power lever 44 is a rigid, elongated rod or bar having a first end 46 and a second end 48. The power lever 44 also is provided with apertures proximate each the first end 46 and the second end 48 for receiving a coupler or fastener as will be described below. A corresponding aperture is provided in the first and second elongated member 12, 14, respectively. The blade 34 of the metal plate 16 can be provided with a cutting edge with a bevel on either side or both sides of the cutting edge of the blade 34. The central aperture 38 is sized to receive a coupler or fastener to couple the plate 16 to the first elongated member 12 near the rear end of the jaw 20. The second elongated member 14 is coupled to the plate 16 by a coupler or fastener engaging the second elongated member 14 and the metal plate 16 at the second aperture 40. The couplers provide a means for coupling the elongated members.

Each of the first and second elongated members 12, 14, are pivotably connected to the plate 16 at the central and second apertures, 38, 40, respectfully. See FIG. 1. In addition, the first and second elongated members 12, 14 are pivotably connected each to one end of the power lever 44. The first end 46 of the power lever 44 is coupled to the second elongated member 14 by a coupler 54 mounted in an aperture in the power lever 44 and a corresponding aperture in the second elongated member 14. The other end 48 of the power lever 44 is coupled to the first elongated member 12 by a coupler 56 through an aperture in the power lever 44 and a corresponding aperture in the first elongated member 12. The coupler 54, 56 can be a convenient fastener such as a bolt and preferably a rivet. The fastener or coupler may also be provided with a plastic fill in the aperture which forms a threaded hole when the coupler or fastener is inserted into the apertures of the power lever 44 and the apertures in the elongated members 12, 14. It is also contemplated that the coupler can be a metal or other suitable material pin molded into the elongated member 12, 14 and aligned with the aperture in the power lever.

With the power lever 44 coupled to the first and second elongated members 12, 14, the second elongated member 14 moves linearly toward the first elongated member 12 for pivotable movement of the blade 34 and the jaw 20 in response to pivotal movement of the first and second handles 18, 22 about the central and second apertures 38, 40 respectfully. The power lever 44 coupled to the two elongated members or handles 12, 14 of the present cutting device 10 cause the handles 12, 14 to move towards each other in a linear fashion, the effect of which is to maximize the force being exerted by the fingers of the operator's hand. The power lever 44 links the elongated members 12, 14 together and minimizes or eliminates the moment force about a pivot point connecting the cutting blades. Prior art cutting devices have one or more pivot points about which the handles and blades rotate thereby exerting a moment force about the pivot during the cutting stroke. The present cutting device 10 does not work in such manner because of the linear motion imparted to the elongated members 12, 14 through the power lever 44 as the operator squeezes the handles together.

FIGS. 3a–3g illustrate the linear movement of the second elongated member 14 toward the first elongated member 12 as the cutting blade 34 moves towards the jaw 20 from an angle of approximately 60 degrees between the blade 34 and the jaw 20 to an angle of zero, i.e., the blade 34 is closed with the jaw 20. The effect of such linear movement of the second elongated member 14 toward the first elongated member 12 during the cutting movement of the blade 34 utilizes the force of all four fingers of the operator's hand that would grip around the handle 22 of the second elongated member 14. In other words, the force applied by the index and middle finger of a hand would be approximately the same as the force applied by the ring finger and little finger of the same hand during the cutting stroke.

In the beginning of the cutting stroke of the cutting device 10 as illustrated in FIGS. 3a and 3b, the blade 34 moves faster and with less power as it initially engages an object to be cut (not shown). As the cutting process proceeds and the blade 34 moves through the object being cut and reaches approximately the middle of the object being cut, at approximately the 30° angle shown in FIG. 3d, the first and second elongated members 12,14 are proximating a parallel position. That position is a result of the power lever 44 forcing the linear movement of the second elongated member 14. The result is that more power goes to turning or moving the blade instead of squeezing the couplers or rivets 50, 52. As the blade angle reaches 10° as shown in FIG. 3f, the couplers 50, 54 and 56 are approaching a straight line and the linkage mechanism works as a 4-lever toggle. As the blade 34 closes with the jaw, with the blade angle being zero, the couplers or fasteners 50, 54, and 56 are closer to a straight line which slows the blade and makes the final cut through the object being cut soft and comfortable thereby eliminating the "snap-effect" experienced with prior art cutting devices.

Figure 2:
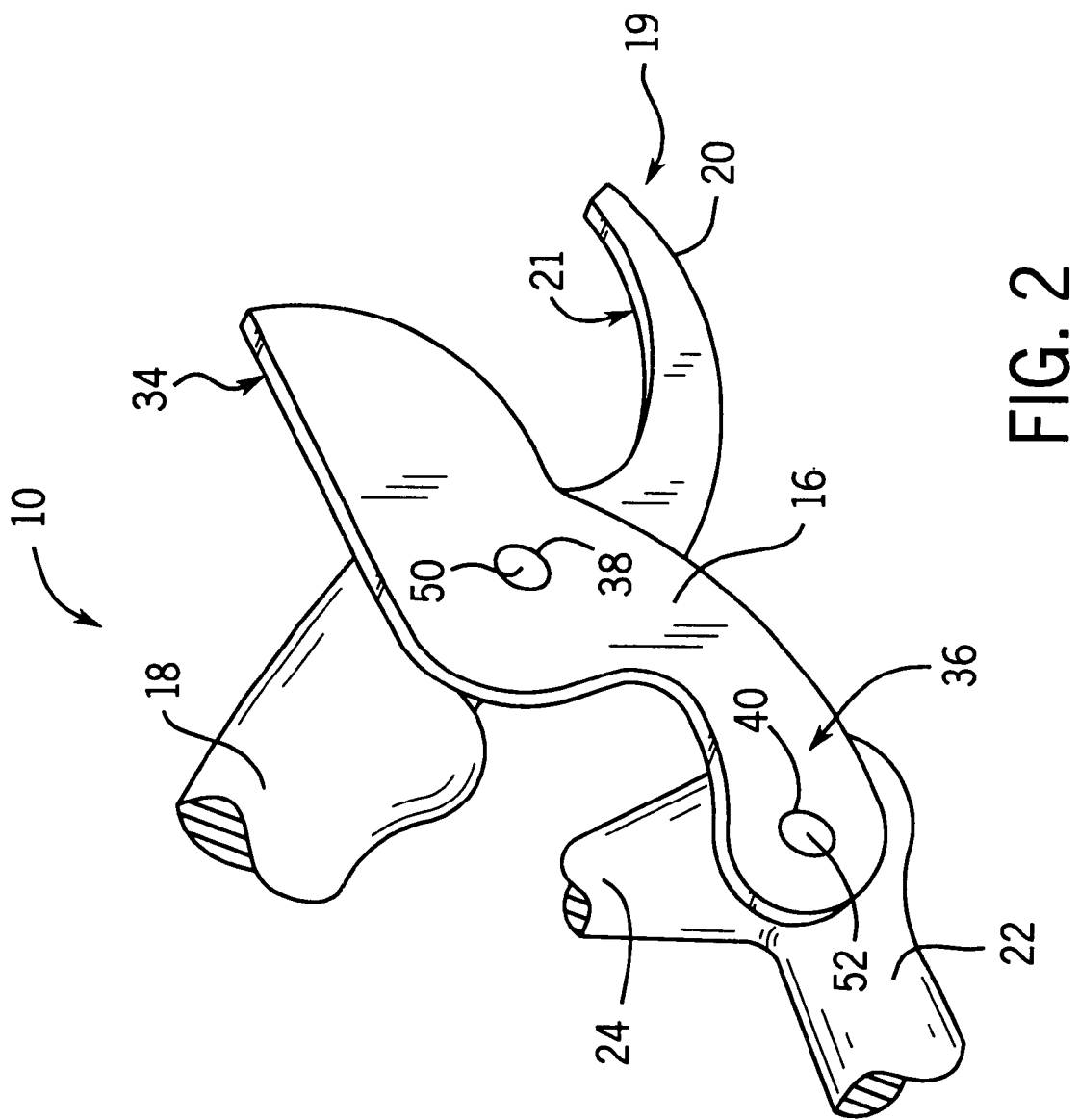
FIG. 2 is a partial, side perspective view of an exemplary embodiment of a power lever cutting device without the power lever.

The cutting device 10 can also be provided with a second elongated member 14 that includes a mounting finger 24 configured to engage one end 46 of the power lever 44. The mounting finger 24 can be integrally formed as one piece with the second elongated member 14 and provides additional mechanical advantage to the linkage mechanism and resists the power lever 44 through the cutting stroke of the cutting device 10. In another embodiment of the cutting device 10 the jaw 20 can be configured as one of an anvil 21 and a blade 23. See FIGS. 1 and 2. The selection of an anvil or the blade configuration for the jaw 20 is made at the time of manufacture and the design of which is determined for the appropriate application to which the tool 10 will be used. The first and second elongated members 12, 14 can be made of a moldable material, such as plastic, and formed as either a solid or a hollow member. It is also contemplated that the first elongated member 12 can be molded onto the jaw 20 during the fabrication process. It is also contemplated that the first and second elongated members 12, 14, the power lever 44 and the plate 16 are all fabricated from metal with the preferred embodiment having at least the first and second elongated members 12 and 14 composed of a moldable material and the plate 16 being metallic.

It should be apparent that there has been provided in accordance with the present invention a power-lever cutting device and that the invention is not limited to the specific forms described. For example, cutting tools in accordance with the invention can be provided with two power-levers with each power-lever mounted on one side of each of the first elongated and second elongated members, thereby sandwiching the elongated members between the two power-levers. Such configuration would facilitate using thinner material for the power-lever. The cutting device can also be configured with a pair of opposed cutting blades, as in bypass pruners, instead of a blade cooperating with an anvil as described in one of the preferred embodiments. It is also contemplated that an aesthetically pleasing shroud or skin can be applied to the cutting device which would enclose the power lever and portions of the first and second elongated members and the plate. It is also contemplated that a power source can be coupled to the cutting device to provide the power to move the elongated member toward and away from each other. For example, a battery powered or hydraulic or internal combustion engine can be used as a power source. Such other constructions are considered to be within the scope of the claims and these and other substitutions, modifications, changes and omissions may be made in the design and arrangement of the elements and in the manufacturing steps disclosed herein without departing from the scope of the appended claims.

What is claimed is:

1. A cutting device, comprising:
   a metal plate having a central aperture, a forwardly extending blade and a rearwardly extending tang having a second aperture offset from the central aperture;
   a first elongated member comprising a first handle terminating at a distal end by a jaw;
   a second elongated member comprising a second handle; and,
   a power lever having a first end and a second end;
   the first and second members being pivotally connected to the plate at the central and second apertures by couplers, respectively, and further pivotally connected each to one end of the power lever, so that the second member moves linearly toward the first member for pivotal movement of the blade and jaw in response to linear movement of the first and second handles.

2. The cutting device of claim 1, wherein the second elongated member includes a mounting finger configured to engage one end of the power lever.

3. The cutting device of claim 2, wherein the mounting finger is integrally formed as one piece with the second elongated member.

4. The cutting device of claim 1, wherein the jaw is configured as one of an anvil and a blade.

5. The cutting device of claim 1, wherein the first and second elongated members are made of a moldable material.

6. The cutting device of claim wherein the first elongated member is molded onto the jaw.

7. The cutting device of claim 5, wherein the first and second handles are hollow.

8. A pruner having a first elongated member and a second elongated member, the pruner comprising:
   a metal plate having a central aperture, a forwardly extending blade and a rearwardly extending tang having a second aperture offset from the central aperture;

a jaw mounted on the first elongated member;

a power lever having a first end and a second end;

a first coupler pivotally mounted in the central aperture and coupling the first member to the plate;

a second coupler pivotally mounted in the second aperture and coupling the second member to the plate;

a third coupler pivotally coupling the first end of the power lever to the second member; and, a fourth coupler pivotally coupling the second end of the power lever to the first member;

the power lever forces the second member to move linearly toward the first member for pivotal movement of the blade and jaw in response to linear movement of the first and second members.

9. The pruner of claim 8, including a mounting finger formed on the second member and configured to engage one end of the power lever.

10. The pruner of claim 9, wherein the mounting finger is integrally formed as one piece with the second elongated member.

11. The pruner of claim 8, wherein the jaw is configured as one of an anvil and a blade.

12. The pruner of claim 8, wherein the first and second elongated members are made of a moldable material.

13. The pruner of claim 12, wherein the first elongated member is molded onto the jaw.

14. The pruner of claim 12, wherein the first and second members are hollow.

15. A cutting device, comprising:

a means for cutting having a central aperture, a forwardly extending blade and a rearwardly extending means for mounting having a second aperture offset from the central aperture;

a first means for holding comprising a first handle terminating at a distal end by a jaw;

a second means for holding comprising a second handle; and, a means for leveraging having a first end and a second end;

the first and second means for holding being pivotally connected to the means for cutting at the central and second apertures by means for coupling, respectively, and further each pivotally connected to different ends of the means for leveraging, so that the second means for holding moves linearly toward the first means for holding for pivotal movement of the blade and jaw in response to linear movement of the first and second means for holding.

16. The cutting device of claim 15, wherein the second means for holding includes a means for resisting configured to engage one end of the means for leveraging.

17. The cutting device of claim 16, wherein the means for resisting is integrally formed as one piece with the second means for holding.

18. The cutting device of claim 15, wherein the jaw is configured as one of an anvil and a blade.

19. The cutting device of claim 15, wherein the first and second means for holding are made of a moldable material.

20. The cutting device of claim 15, wherein the means for cutting is a metallic material.

* * * * *